(12) United States Patent
Eck et al.

(10) Patent No.: US 8,950,824 B2
(45) Date of Patent: Feb. 10, 2015

(54) WHEEL HUB NUT RETAINER PLATE

(75) Inventors: Brian Eck, Bemidji, MN (US); Reid Anderson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 261 days.

(21) Appl. No.: 13/603,188

(22) Filed: Sep. 4, 2012

(65) Prior Publication Data

US 2014/0062173 A1 Mar. 6, 2014

(51) Int. Cl.
*B60B 27/06* (2006.01)
*F16B 39/24* (2006.01)
*B60B 27/00* (2006.01)
*B60B 37/04* (2006.01)
*F16B 39/10* (2006.01)
*F16B 41/00* (2006.01)

(52) U.S. Cl.
CPC ............... *F16B 39/24* (2013.01); *B60B 27/00* (2013.01); *B60B 27/0047* (2013.01); *B60B 37/04* (2013.01); *F16B 39/10* (2013.01); *B60B 27/06* (2013.01); *F16B 41/002* (2013.01); *B60B 2900/3312* (2013.01)
USPC ................ 301/35.58; 301/35.63; 301/111.03

(58) Field of Classification Search
CPC ........ B60B 27/06; B60B 27/065; B60B 37/04; F16B 39/10; F16B 39/24
USPC ............. 301/35.58, 35.621, 35.624, 35.63, 301/105.1, 111.01, 111.02, 111.03; 411/119, 120, 204
See application file for complete search history.

(56) References Cited

U.S. PATENT DOCUMENTS

| | | | | |
|---|---|---|---|---|
| 1,088,515 A | * | 2/1914 | Bazin | 411/120 |
| 2,455,216 A | * | 11/1948 | Blanton | 403/84 |
| 4,735,533 A | * | 4/1988 | Gallagher et al. | 411/119 |
| 6,948,782 B2 | * | 9/2005 | Porter et al. | 301/105.1 |
| 7,213,890 B2 | * | 5/2007 | Porter et al. | 301/105.1 |
| 7,731,463 B2 | * | 6/2010 | Davis | 411/119 |
| 2004/0232760 A1 | * | 11/2004 | Porter et al. | 301/105.1 |
| 2006/0006731 A1 | * | 1/2006 | Porter et al. | 301/105.1 |

\* cited by examiner

*Primary Examiner* — Kip T Kotter
(74) *Attorney, Agent, or Firm* — Lowe Graham Jones PLLC

(57) ABSTRACT

A retainer plate for preventing or at least mitigating loosening of an axle nut of a vehicle. The retainer plate comprises a generally flat section of rigid material that couples to an axle nut in a non-rotatable fashion and to a portion of the wheel to maintain the axle nut in tight threaded engagement with the axle. The retainer plate can have a central bore that non-rotatably engages the axle nut and a radially outward feature that engages the wheel to prevent the axle nut from loosening.

22 Claims, 3 Drawing Sheets

WHEEL HUB NUT RETAINER PLATE

FIELD OF INVENTION

This invention relates generally to a plate for a vehicle that couples to wheel mounting studs and to an axle nut to prevent the axle nut from loosening from the axle.

BACKGROUND OF THE INVENTION

Fundamental to any wheeled vehicle, such as all-terrain vehicles ("ATVs") and recreational off-road vehicles ("ROVs") are wheels carried by axles. Live axles are driven by the vehicle's engine, and the turning axle causes the wheels to rotate. The coupling between the axle and the wheel ensures that energy provided by the engine can translate into movement of the wheel and ultimately propelling the vehicle. The axle has an axle nut at the end of the axle to hold the wheel and perhaps a hub assembly to the axle. Occasionally, the axle nut can work loose or even fall off the axle. Previous attempts at solving this problem, such as a simple cotter pin passing through the axle nut, are often inadequate. In some cases, the cotter pin shears off under high impact loads. These attempts provide no effective impediment to the axle nut loosening— merely an indication that the axle nut has rotated some unknown degree. There is a need for a lightweight and economical device to ensure that the axle nut does not rotate relative to the axle and loosen.

SUMMARY OF THE INVENTION

The present invention is directed to an axle nut retainer for a vehicle having an axle with a rotational axis and a wheel. The retainer plate interfaces with an axle nut. The axle nut is configured to fasten to an axle of a vehicle, the axle nut having a keyed shape, such as a hexagonal outer shape or other non-circular shape. The plate also has a corresponding keyed axle nut-receiving portion and a lug-receiving portion. The "keyed" axle nut-receiving portion is preferably keyed to at least a portion of the keyed shape of the axle nut, but may not be keyed to the complete outer shape of the axle nut. The axle nut-receiving portion is spaced apart from the lug-receiving portion in a direction perpendicular from the rotational axis of the axle. The lug-receiving portion is coupled to a hub lug. (i.e., the lug bolt or wheel stud of the wheel) The axle nut is positioned within the keyed nut-receiving portion. The axle nut and the keyed axle nut-receiving portion of the plate are non-rotatably coupled together to inhibit rotation of the axle nut relative to the axle. In at least one embodiment, the plate comprises an elongated member extending from the axle nut-receiving portion to the radially outward portion.

In other embodiments, the present invention is directed to a wheel assembly including a hub and a plurality of lugs. The hub is coupled to an axle of a vehicle, the axle having an axis of rotation. The plurality of lugs extend from the hub in a direction generally parallel with the axis of rotation and spaced apart from the axle in a direction generally perpendicular to the axis of rotation. The wheel assembly further includes a nut coupled to the axle and configured to hold the hub to the axle, and a retaining plate non-rotatably coupled to the nut and coupled to one or more of the lugs. The wheel assembly can further include a wheel coupled to the lugs with the retaining plate between the hub and the wheel, wherein the retaining plate prevents the nut from rotating relative to the axle.

In still further embodiments, the present invention includes a retaining plate for a wheeled vehicle having an axle, an axle nut, and a wheel. The retaining plate includes a generally flat region extending in a direction perpendicular to the axle, and a first engagement portion being non-rotatably coupled to the axle nut. The retaining plate also includes a second engagement portion coupled to a portion of the wheel that rotates as the wheel rotates. The portion of the wheel is spaced apart from the axle, and the retaining plate resists rotation of the axle nut relative to the axle by virtue of a moment arm formed by the portion of the retaining plate spanning the distance between the first and second engagement portions.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

Figure 1:
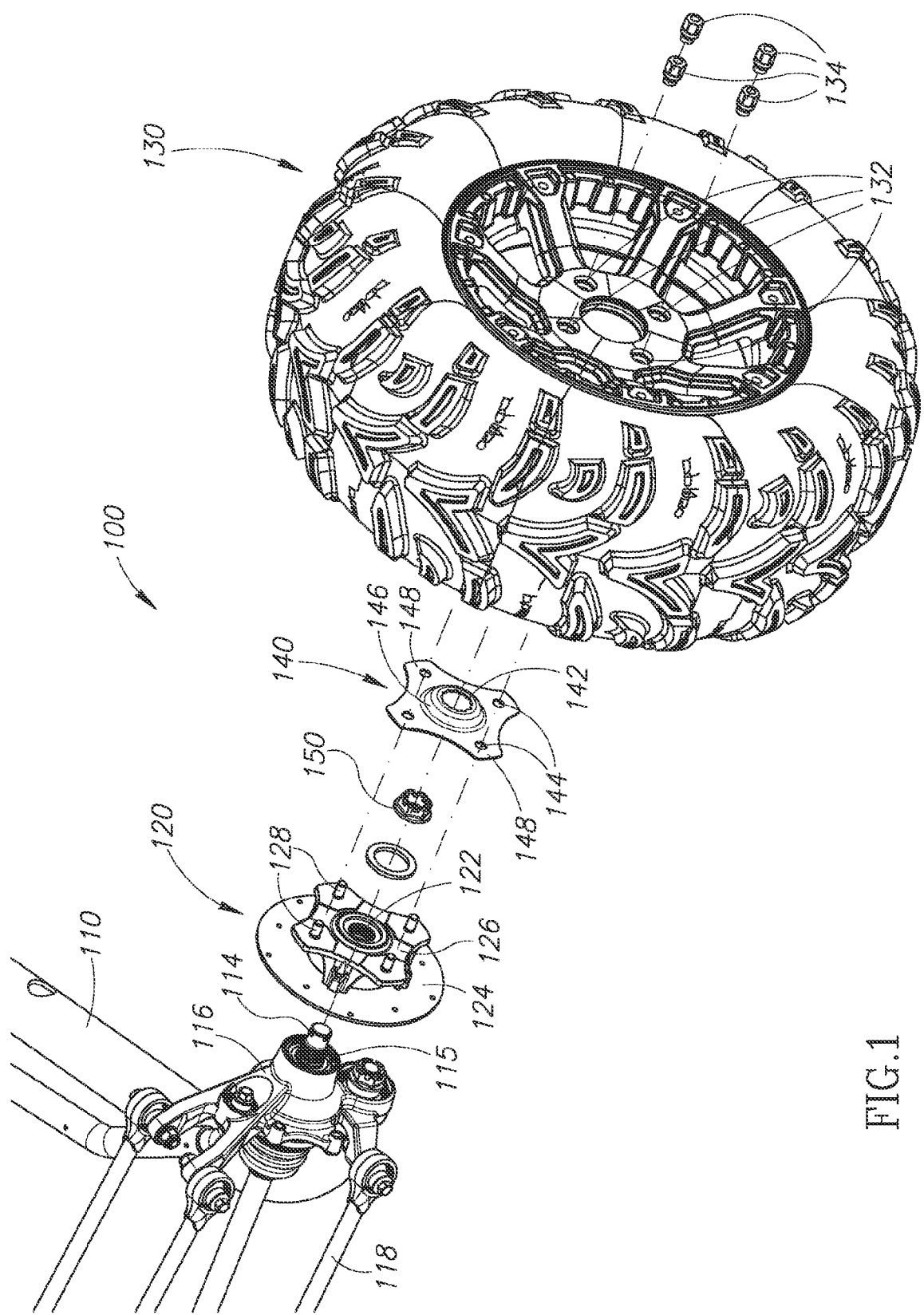
FIG. 1 is an exploded view of a wheel assembly, a hub assembly, and a retaining plate according to embodiments of the present invention.

FIG. 1 is an exploded view of a wheel assembly 100 according to embodiments of the present invention. The wheel assembly 100 can be used with a vehicle 110, such as a recreational off-road vehicle ("ROV") or an all-terrain vehicle ("ATV") or any other suitable wheeled vehicle. The vehicle 110 has an axle 114 supported by a knuckle assembly 116 and a rear suspension 118. The axle 114 includes an axle nut 150 that threadably engages the end of the axle 114. The wheel assembly 100 includes a hub assembly 120 that is non-rotatably coupled to the axle 114 and rotates with the axle 114. The nut 150 secures the hub assembly 120 to the vehicle 110. The hub assembly 120 has non-circular features, such as teeth 122 that mesh with corresponding teeth 115 on the axle 114 to ensure that rotation of the axle 114 is transmitted to rotation of the hub 120. The hub assembly 120 also includes a disc 124 for braking purposes, a base 126, and lugs 128 extending from the base 126. The wheel assembly 100 also includes a wheel 130 having lug holes 132 that engage the lugs 128 to secure the wheel 130 to the hub assembly 120. The wheel 130 is secured to the hub assembly 120 by lug nuts 134.

The wheel assembly 100 also includes a retaining plate 140, which can be positioned between the hub assembly 120 and the wheel 130 (as shown in FIG. 1). The retaining plate 140 can alternatively be positioned outboard of the wheel 130. With the retaining plate 140 positioned between the hub assembly 120 and wheel 130 and with the hub assembly 120 and wheel 130 clamped against the retaining plate 140, the friction between the components is sufficient to prevent the axle nut 150 from loosening. The plate 140 includes a radially outward portion 148 spaced apart radially from the center of the plate 140, defining a moment arm between the center of the plate 140 and the radially outward portion 148. The retaining plate can have a first aperture 142 and at least one second aperture 144 on the radially outward portion 148 spaced apart from the first aperture 142. Preferably, plate 140 includes second apertures 144 for each lug 128 with an appropriate clearance between the lugs 128 and the second apertures 144. For example, an appropriate clearance is one that enables installation but prevents excessive rotation of the plate 140. In the illustrated embodiment the first aperture 142 is positioned centrally on the plate 140 and the second apertures 144 are positioned around a periphery of the plate 140, and there are four second apertures 144 corresponding to the four lugs 128. The axle 114 protrudes through the hub assembly 120 and is engaged with the nut 150, which is engaged non-rotatably with the retaining plate 140. The nut 150 can be a hexagonal nut or other keyed shape to facilitate the non-rotational coupling with a tightening tool (not shown). The first aperture 142 of the retaining plate 140 has a corresponding keyed shape that engages the nut 150 such that the plate 140 prevents the nut 150 from loosening or rotating relative to the axle 114. In the preferred embodiment, the plate 140 includes twelve evenly spaced recesses to engage the hexagonal nut 150 at multiple rotational placements. The second apertures 144 engage the lugs 128. The distance between the first aperture 142 and the second apertures 144 serves as a moment arm by which the retaining plate resists rotation of the nut 150 relative to the axle 114 to prevent loosening of the axle nut 150. In some embodiments the primary retaining force is the friction between the retaining plate 140, the wheel 130, and the hub assembly 120. The lugs 128 and second apertures 144 can be a secondary retaining force. For example, if the wheel 130 and hub assembly 120 loosen and friction lessens, the lugs 128 engage the retaining plate 140 to resist loosening of the nut 150. In other embodiments the engagement between the lugs 128 and the second apertures 144 is itself the primary resisting force.

In other embodiments the apertures 142, 144 can be any suitable engagement feature, such as a C-shaped recess or clip or bolt that secures to the nut 150 and lug 128, respectively. In other embodiments, the retaining plate 140 can engage with a portion of the wheel 130 other than the lugs 128, such as a protrusion and or recess feature of the hub 120 and or wheel or the spokes of the wheel 130. The retaining plate 140 can engage with any feature that, during operation of the vehicle 110, rotates with the nut 150 so that the retaining plate 140 can prevent or at least substantially mitigate loosening of the nut 150. In other embodiments the retaining plate 140 is not a plate at all; rather, the plate 140 can be a single member extending from the nut 150 and one of the lugs 128, somewhat resembling a crescent wrench, but still having non-rotating engagement features 142, 144 to prevent loosening of the axle nut 150. In some embodiments, two or more of these members can be usedone for each lug 128. With more members engaging more lugs 128, the loosening resistance is increased. In some cases where loosening is particularly prevalent and potentially harmful, a retaining plate engaging many lugs 128 can be used. In other circumstances where the loosening phenomenon is less prevalent or less severe, fewer engagement apertures 144 can be used at the discretion of the operator. The preferred plate shown, which engages all four lugs also operates to keep the spacing between the hub and the wheel consistent.

In general, the greater the distance separating the lugs 128 (or other point at which the retaining plate 140 engages the hub 120 and or wheel 130) and the nut 150 the greater the loosening resistance due to the greater leverage. However, even a small distance between the first aperture 142 and second aperture 144 strongly resists loosening of the nut 150.

The retaining plate 140 can include a shaped portion 146 that protrudes from the body of the plate 140. The shaped portion 146 can allow the plate 140 to conform to the shape of the wheel 130 and more particularly to the hub against which the plate 140 rests. The profile of the retaining plate 140 can vary according to the space in which the plate 140 is disposed. The plate 140 can, in some embodiments, be thin enough to be inserted between wheel components of an existing vehicle that was not specifically designed for use with the retaining plate 140, but that, nevertheless, benefits from the nut loosening prevention that the plate 140 provides. In some embodiments, the plate 140 can be placed outboard of the wheel 130, in which case there is presumably more room in which the plate 140 can operate. In such embodiments, the plate 140 can engage the lug nuts 134, and not the lugs 128 directly. In some embodiments in which the axle nut 150 does not protrude beyond the outer surface of the hub, the retaining plate 140 can include a shaped portion 146 that protrudes inboard from the body of the plate 140 to engage the axle nut 150. The shape of the wheel 130 can determine how the retaining plate 140 will engage the axle nut 150 and lugs 128.

Figure 2:
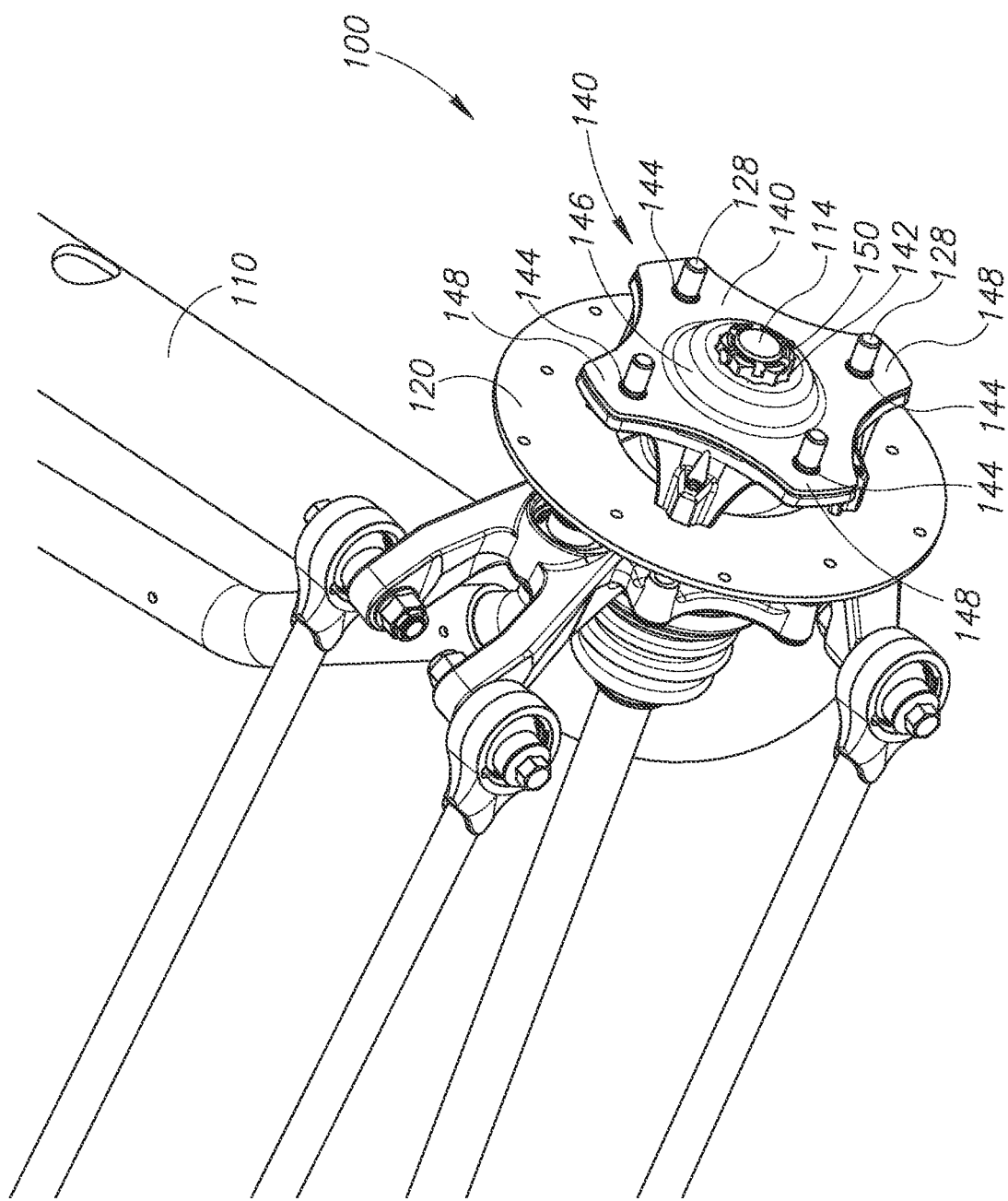
FIG. 2 is an assembled view of the wheel assembly of FIG. 1 according to embodiments of the present invention.
Figure 3:
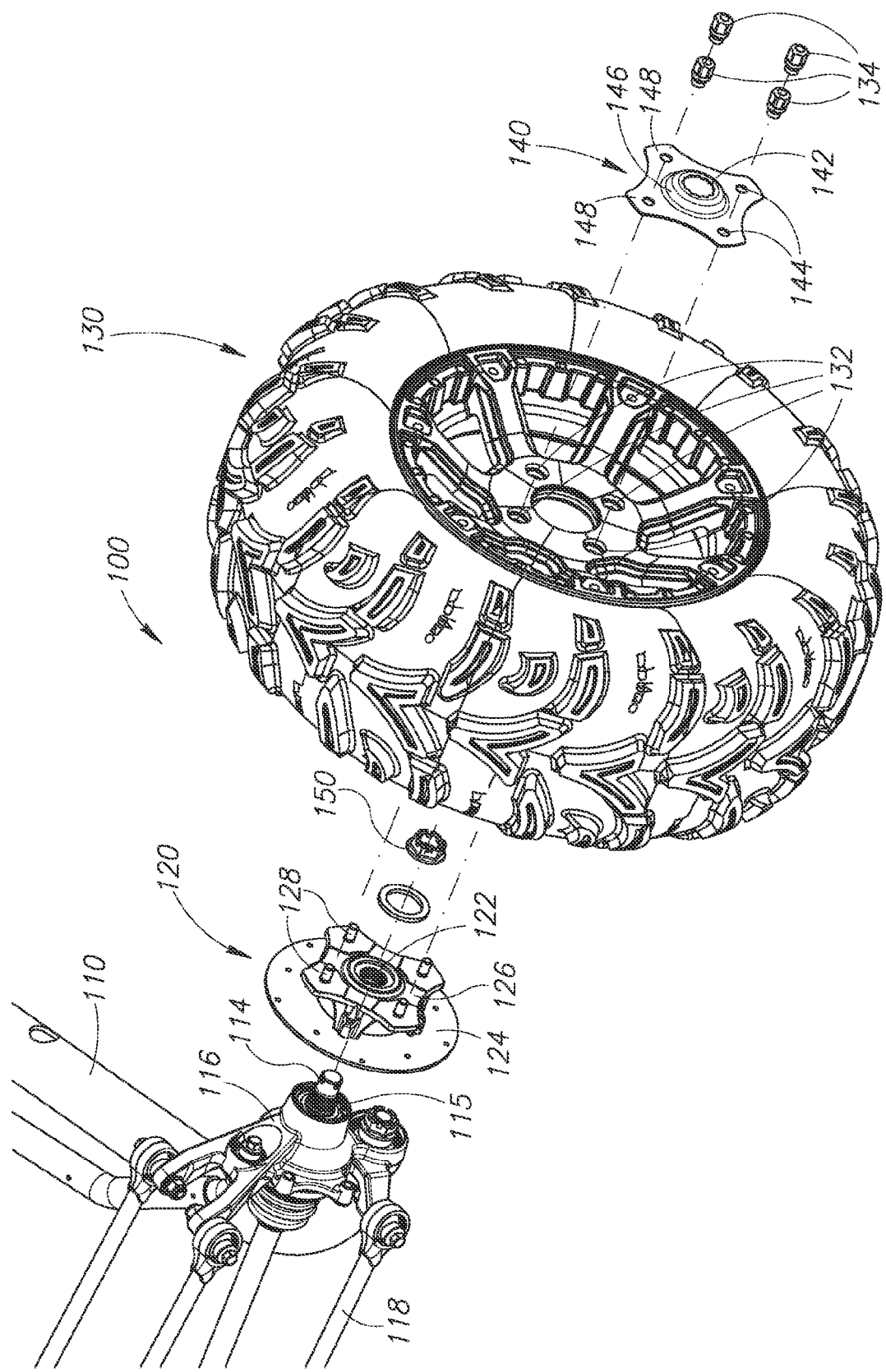
FIG. 3 shows a similar exploded view to that of FIG. 1, however the retaining plate is positioned outbound of the wheel.

FIG. 2 illustrates a wheel assembly 100 according to the present disclosure in which the retaining plate 140 is positioned on the hub assembly 120. The first aperture 142, or engagement portion, is non-rotatably coupled to the axle nut 150. In this embodiment, the nut 150 is a hexagonal nut, but the nut 150 can have any keyed shape that enables a torque to be applied to the nut. The second apertures 144 of the retaining plate 140 engage with the lugs 128. The retaining plate 140 permits the wheel 130 shown in FIG. 1 to be mounted normally to the lugs 128. The retaining plate 140 prevents, or at least substantially mitigates, loosening of the nut 150.

While the preferred embodiments of the invention have been illustrated and described, as noted above, many changes can be made without departing from the spirit and scope of the invention. Accordingly, the scope of the invention is not limited by the disclosure of the preferred embodiments. For example, the present invention can include other mechanical equivalents that prevent an axle nut from loosening from the axle, including a retaining arm extending from the axle nut to a single lug or to another portion of the wheel. Other embodiments are also possible. Accordingly, the invention should be determined entirely by reference to the claims that follow.

The invention claimed is:

1. A retainer for a vehicle having an axle with a rotational axis, a wheel, and an axle nut configured to fasten to the axle of the vehicle, the axle nut having a keyed shape, the retainer comprising a plate having a keyed axle nut-receiving portion and a radially outward portion spaced apart from the axle nut-receiving portion in a direction perpendicular from the rotation axis of the axle, wherein:

the radially outward portion is non-rotatably coupled to and frictionally engaged with the wheel to prevent the plate from rotating relative to the wheel, the axle nut is positioned within the keyed nut-receiving portion, and wherein the axle nut and the keyed axle nut-receiving portion of the plate are non-rotatably coupled together to inhibit rotation of the axle nut relative to the axle.

2. The retainer of claim 1 wherein the keyed axle nut-receiving portion is configured to receive the axle nut and the axle nut is a hexagonal nut.

3. The retainer of claim 1 wherein the non-circular axle nut-receiving portion has a 24-sided shape.

4. The retainer of claim 1 wherein the non-circular axle nut-receiving portion is centrally located in the plate.

5. The retainer of claim 1 wherein the radially outward portion comprises a plurality of holes configured to engage with lugs of the vehicle.

6. The retainer of claim 5 wherein the radially outward portion comprises a bore that loosely engages the lug to prevent the plate from rotating relative to the wheel.

7. The retainer of claim 1 wherein the plate further comprises a generally flat region extending generally perpendicular to the rotational axis of the axle, and a central shaped portion that protrudes from the plate.

8. The retainer of claim 7 wherein the central shaped portion is shaped to allow the keyed axle nut-receiving portion to engage the axle nut.

9. The retainer of claim 1 wherein the plate comprises an elongated member extending from the axle nut-receiving portion to the radially outward portion.

10. A wheel assembly, comprising:
a hub coupled to an axle of a vehicle, the axle having an axis of rotation;
a nut coupled to the axle and configured to hold the hub to the axle;
a retaining plate non-rotatably coupled to the nut and non-rotatably coupled to the hub;
a plurality of lugs extending from the hub in a direction generally parallel with the axis of rotation and spaced apart from the axle in a direction generally perpendicular to the axis of rotation, wherein the retaining plate is coupled to one or more of the plurality of lugs to prevent rotation of the plate relative to the hub; and
a wheel coupled to at least one of the plurality of lugs with the retaining plate between the hub and the wheel, wherein the retaining plate prevents the nut from rotating relative to the axle.

11. The wheel assembly of claim 10 wherein the nut comprises a hexagonal nut.

12. The wheel assembly of claim 10 wherein the plate has a keyed aperture configured to receive the nut.

13. The wheel assembly of claim 12 wherein the keyed aperture comprises an internal surface having multiple flat surfaces that engage with corresponding surfaces on the nut.

14. A retaining plate for a wheeled vehicle having an axle, an axle nut, and a wheel, the retaining plate comprising:
a generally flat region extending in a direction perpendicular to the axle, wherein at least a portion of the flat region is frictionally engaged with the wheel;
a first engagement portion being non-rotatably coupled to the axle nut;
a second engagement portion coupled to a portion of at least one of the wheel or a hub that rotates as the axle rotates, wherein the portion of at least one of the wheel or the hub is spaced apart from the axle, wherein the retaining plate resists rotation of the axle nut relative to the axle by virtue of a moment arm formed by the portion of the retaining plate spanning the distance between the first and second engagement portions.

15. The retaining plate of claim 14 wherein the wheeled vehicle comprises a recreational off-road vehicle or an all-terrain vehicle.

16. The retaining plate of claim 14 wherein the engagement portions comprise apertures.

17. The retaining plate of claim 14 wherein the retaining plate is positioned between the wheel and the vehicle.

18. The retaining plate of claim 14 wherein the retaining plate is positioned outboard of the wheel.

19. The retaining plate of claim 14 wherein the portion of the wheel comprises at least one of spokes, lugs, or lug nuts of the wheel.

20. The retaining plate of claim 14 wherein the retaining plate is configured and arranged to engage with a protrusion of the hub.

21. A retainer for a vehicle having an axle with a rotational axis, a wheel, and an axle nut configured to fasten to the axle of the vehicle, the axle nut having a keyed shape, the retainer comprising a plate having a keyed axle nut-receiving portion and a radially outward portion spaced apart from the axle nut-receiving portion in a direction perpendicular from the rotation axis of the axle, wherein:
the radially outward portion comprises a plurality of holes configured to engage with lugs of the vehicle and is non-rotatably coupled to the wheel to prevent the plate from rotating relative to the wheel,
the axle nut is positioned within the keyed nut-receiving portion, and wherein
the axle nut and the keyed axle nut-receiving portion of the plate are non-rotatably coupled together to inhibit rotation of the axle nut relative to the axle.

22. The retainer of claim 21, wherein the radially outward portion comprises a bore that loosely engages the lug to prevent the plate from rotating relative to the wheel.

* * * * *